United States Patent
Keemer et al.

[11] Patent Number: 5,993,523
[45] Date of Patent: Nov. 30, 1999

[54] INHIBITED METAL PIGMENT PASTES CONTAINING MOLYBDATE PIGMENTS AND SUITABLE FOR AQUEOUS COATING COMPOSITIONS

[75] Inventors: Craig B. Keemer, Reading; William G. Jenkins, Lakesville; H. Taylor Lamborn, Reading; Robert E. Souerwine, Slatington, all of Pa.

[73] Assignee: Silberline Manufacturing Co., Inc., Tamaqua, Pa.

[21] Appl. No.: 09/092,385

[22] Filed: Jun. 5, 1998

[51] Int. Cl.$^6$ ...................................................... C09D 1/62
[52] U.S. Cl. ..................................... 106/14.21; 106/14.05; 106/14.12; 106/14.44; 106/403; 106/404; 106/419; 106/431; 106/461; 106/479; 106/480; 428/403; 428/469
[58] Field of Search ............................. 106/14.05, 14.12, 106/14.21, 403, 404, 480, 14.44, 419, 431, 461, 479; 428/403, 469

[56] References Cited

U.S. PATENT DOCUMENTS

| | | | |
|---|---|---|---|
| 3,423,229 | 1/1969 | Kompanek, Jr. et al. | 427/344 |
| 3,969,127 | 7/1976 | Robitaille et al. | 106/14.21 |
| 4,017,315 | 4/1977 | Vukasovich et al. | 106/14.21 |
| 4,294,808 | 10/1981 | Wasel-Nielen et al. | 423/305 |
| 4,370,382 | 1/1983 | Salensky | 428/418 |
| 4,565,716 | 1/1986 | Williams, Jr. et al. | 427/216 |
| 4,693,754 | 9/1987 | Kondis | 106/404 |
| 4,785,088 | 11/1988 | Flohr et al. | 540/127 |
| 4,808,231 | 2/1989 | Kondis et al. | 106/404 |
| 4,840,668 | 6/1989 | Gawol et al. | 106/14.21 |
| 4,851,549 | 7/1989 | Flohr et al. | 549/206 |
| 4,861,379 | 8/1989 | Imai et al. | 106/402 |
| 4,869,754 | 9/1989 | Kawabe et al. | 106/404 |
| 4,937,338 | 6/1990 | Flohr et al. | 540/64 |
| 5,158,610 | 10/1992 | Bittner | 106/462 |
| 5,215,579 | 6/1993 | Keemer et al. | 106/404 |
| 5,236,983 | 8/1993 | Hegedus et al. | 524/204 |
| 5,296,032 | 3/1994 | Jenkins et al. | 106/404 |
| 5,322,560 | 6/1994 | Depue et al. | 106/14.21 |
| 5,348,579 | 9/1994 | Jenkins et al. | 106/404 |
| 5,356,469 | 10/1994 | Jenkins et al. | 106/404 |

*Primary Examiner*—Anthony Green
*Attorney, Agent, or Firm*—Merchant & Gould P.C.

[57] ABSTRACT

Metal particles useful for coating compositions, particularly aqueous coating compositions, are produced by treating the metal particles with a molybdate pigment. The molybdate pigment reacts with the surface of the metal particles. The molybdate pigment may be a salt such as a molybdate, phosphomolybdate or silicomolybdate salt, and the salt may include a multivalent cation such as calcium, strontium, barium, magnesium, zinc and aluminum. The metal particles show improved resistance to attack by water.

16 Claims, No Drawings

INHIBITED METAL PIGMENT PASTES CONTAINING MOLYBDATE PIGMENTS AND SUITABLE FOR AQUEOUS COATING COMPOSITIONS

BACKGROUND OF THE INVENTION

The present invention is directed to metal particles used for forming coating compositions. Such particles are used, for example, to provide metallic coatings for automotive use and in general maintenance, industrial and roof coating systems. The metal particles are typically in the form of flakes, and are provided in the form of a paste that is mixed with a suitable vehicle or carrier to form a coating.

In the past, organic solvent-based vehicles have been used for coating compositions, with good results. However, the use of such organic-based coating compositions results in the release of significant amounts of volatile organic material into the atmosphere, which has been determined to be damaging to the environment, and increasingly strict regulations against organic emissions have been implemented. One way for coating compositions to comply with the new regulations is to convert from organic-based vehicles for the compositions to aqueous-based vehicles, since in such cases water is released to the atmosphere instead of volatile organic material.

In the case of metallic coating compositions, the use of aqueous vehicles is problematic, since water can react with the metal particles to generate hydrogen gas. This is particularly true for zinc and aluminum particles. The reaction of aluminum particles with water is depicted below as an example.

$$2Al + 6H_2O \rightarrow 2Al(OH)_3 + 3H_2$$

The amount of gas generated can produce a safety hazard, resulting in high pressures in composition containers. In addition, the water reaction significantly reduces the aesthetic value of the metal particles.

A number of techniques have been proposed for combating the problem of water reaction with metal particles in aqueous coating systems. One example is the passivation of metal particles with organic phosphate (U.S. Pat. No. 4,565, 716). Another is the use of hexavalent chromium or pentavalent vanadium compounds (U.S. Pat. No. 4,693,754). Other techniques include the use of organic phosphites (U.S. Pat. No. 4,808,231) and the use of nitroparaffin solvents, and the use of nitroparaffin solvents in combination with organic phosphate, organic phosphite or pentavalent vanadium compound (U.S. Pat. No. 5,215,579). The use of heteropolyanions and phosphosilicate pigments as treating agents, alone and in combination, also has been contemplated (U.S. Pat. Nos. 5,296,032, 5,348,579 and 5,356,469). The disclosures of each of the patents mentioned above are incorporated herein by reference. While some degree of success has been achieved with these treatments, still further improvements in providing resistance to attack from aqueous carriers for metal particles having desired properties for coating compositions have been desired.

SUMMARY OF THE INVENTION

In accordance with the present invention, metal particles useful for coating compositions are treated with a corrosion-inhibiting molybdate pigment. The molybdate pigment has been found to provide highly desirable protection for the metal particles against attack from aqueous media, without significant adverse impact on the properties of the metal particles as components of the coating system. The treated metal particles are resistant to hydrogen gas evolution, and maintain useful aesthetic values as well as intercoat and intracoat adhesion values in a paint film. The molybdate pigment treatment is easily adapted to the paste form in which metal particles are often supplied, and thus the molybdate pigment treatment is well-suited for practical application. It is believed that the molybdate pigment undergoes a chemical reaction with the surface of the pigment. In a preferred aspect of the invention, the molybdate pigment is in the form of a salt, with molybdate, phosphonolybdate or silicomolybdate salts with multivalent cations being preferred examples.

Other objects, advantages and features of the present invention will be more readily appreciated and understood when considered in conjunction with the following detailed description.

DETAILED DESCRIPTION

The present invention is directed to the treatment of metal particles that are useful for forming metallic coating compositions. Such metal particles are generally provided in flake form, although in some crises, spherical (and other) forms may be used. The metal particles generally will have a particle size of about 1–500 microns, preferably 5–100 microns. The metal particles are used in a wide variety of coating compositions, including automotive coating systems (to provide the metallic finish on cars and trucks), and in general maintenance, industrial and roof coating systems, the present invention may be used, for example, with metal particles used of aluminum, zinc or bronze, with aluminum being perhaps the most widely-used.

In accordance with the present invention, the metal particles are treated with a molybdate pigment to in crease the resistance of the metal particle to attack from an aqueous media, for example the vehicle or carrier of an aqueous coating composition. Thus, the metal particles treated in accordance with the present invention are suitable for use in aqueous coating compositions, enjoying significantly reduced levels of hydrogen gas evolution, without loss of intercoat or intracoat adhesion or degradation of optical properties.

The molybdate pigment can be considered corrosion-inhibiting, and such pigments have generally been considered for use in primers and maintenance coatings, where they protect an underlying substrate from corrosion. The molydate pigment generally will be in the form of an inorganic salt. In one example, the salt includes a multivalent cation such as calcium, strontium, barium, magnesium, zinc and aluminum. A plurality of cations can be included. The molybdate salt can be in the form of a molybdate, phosphomolybdate or silicomolybdate salt, for example. Specific non-limiting examples include zinc phosphomolybdate, calcium-zinc molybdate, magnesium-zinc silicomolybdate, calcium-zinc phosphomolybdate and zinc molybdate. It is believed that the molybdate pigment chemically reacts with the surface of the metal particles in providing the increased resistance to aqueous attack.

The metal particles can be treated with the molybdate pigment in a liquid medium. In order to use metal particles for forming coating compositions, the metal particles often will be supplied in the form of a paste containing the metal particles in an amount of about 40–90% by weight. The treatment with the molybdate pigment is well-suited to the formation of a paste containing metal particles.

In one example, the corrosion-inhibiting molybdate pigments can be dispersed in a liquid in order to reduce the particle size of the molybdate pigments to a level sufficient to avoid formation of seeds in a dried paint film. It is useful if the particle size of the molybdate pigments is no more than 10 microns, preferably no more than 5 microns. The liquid can be any liquid that it is compatible with the molybdate pigment and with the intended coating composition. Examples, which can be selected depending on the particular coating system in question, include nitroparaffins, mineral spirits, high-flash naphtha, glycol ethers, glycol either acetates, water, esters, ketones, and combinations thereof. Additional ingredients, such as surfactants, anti-foaming agents and dispersants may be used as desired. Among nitroparaffins, the lower members of the series, e.g. nitromethane, nitroethane and 1-nitropropane, are desirable on the basis of advantageous toxocolgical properties and availability. Polar solvents such as glycol ethers generally provide the best dispersability of the pigment.

The molybdate pigment can be dispersed in the solvent using high-shear equipment, such as high speed dispersers, ball mills, media mills, attritors, rotor-stator homogenizers and the like. Usually the solvent:pigment ratio will be in the range of 4:1 to 1:4 by weight, preferably 2:1 to 1:2. The ratio can be varied as needed to provide the best balance of grind time, i.e. efficiency, and pourability.

The dispersion of the molybdate pigment then can be used in a paste reduction process. That is the dispersion of the molybdate pigment in the liquid is used to dilute (i.e. "reduce") a metal particle paste. Such pastes, may be, for example, about 60–95% by weight (preferably 65–82%) metal particles in mineral spirits. The paste is charged into a mixer and the molybdate pigment dispersion is added thereto. The amount of the molybdate pigment dispersion can be in an amount sufficient to provide 1–50% by weight, preferably 5–30%, of molybdate pigment with respect to metal particles. Other organic solvents can be added as well if needed. The total amount of liquid added to the paste generally will yield a final non-volatile content of about 60–72% by weight for the mixture. The mixture is then mixed mechanically for a suitable period of time, typically from 5 minutes to 8 hours, at a suitable temperature, for example ambient to 100° C. The mixing conditions should be sufficient to ensure uniform distribution of molybdate pigment dispersion and metal particles, but not sufficient to result in adverse affects on the properties of the metal particles, especially the optical characteristics.

As another example of a method for treating the metal particles with the corrosion-inhibiting molybdate, pigment, metal particle paste can be mixed with a solvent to form a slurry having about 1–50% by weight, preferably 10–30%, of metal particles. The dispersion of corrosion-inhibiting molybdate pigment is added in a quantity sufficient to provide the amount of pigment with respect to metal particles discussed above. The mixture is then agitated, again to ensure uniform distribution without adversely affecting the metal particles, and in this case the agitation can take place, for example at ambient temperature to 100° C. for a time of 5 minutes to 24 hours, preferably 30 minutes to 2 hours. Liquid then is removed from the mixture, for example by filtration, to obtain the desired paste, which typically will have a metal particle content of 40–90% by weight. The molybdate pigment remains with the filter cake.

The metal particles often will be formed by a milling process. It also is possible to carry out the treatment with the molybdate pigments in situ as the particles are milled. For example, the molybdate pigment can be included in the liquid in a ball mill in which the metal particles are milled. The molybdate pigments generally should be suitable for use with known milling lubricant systems, and the surface of the metal particles will be stabilized as the particles are produced.

In any of the methods of treating the metal particles discussed above, additional materials such as surfactants, dispersants, anti-foaming agents, rheology control agents and the like can be used as needed.

The metal particles of the present invention, and the pastes containing them, can be used as direct replacements for current products in a variety of known coating systems. Examples include maintenance, general industrial, roof coating and automotive coating systems. These include, as non-limiting examples, acrylic polymer emulsions, water reducible alkyd resin systems, water reducible alkyd/melamine cross-linked systems, waterborne epoxy systems, polyester emulsions and water reducible polyester melamine coatings.

It also is possible to treat the metal particles after they have been combined with an aqueous coating vehicle. Thus, the molybdate pigment, either alone or in combination with other treatment methods, e.g nitroparaffin, organic phosphate, organic phosphite, heteropolyanion, phosphosilicate, chromium and vanadium treatments, can be added to an aqueous carrier itself either before or after the metal particles have been added to the coating composition. If the molybdate pigment is added after the metal particles have been added to the coating composition, the delay should not be long, in general not more than 30 minutes, since a long delay would permit the aqueous carrier to attack the metal particles. In the case where the addition is made to the coating composition, the amount of molybdate pigment can be the same as discussed for producing treated particles in paste form. Simple mixing techniques can be employed.

The treatment with corrosion-inhibiting molybdate pigment in accordance with the present invention can be combined with the other treatment methods discussed above, e.g nitroparaffin, organic phosphate, organic phosphite, heteropolyanion, phosphosilicate, chromium and vanadium. The combined treatments may yield results that are improved versus the results of the individual treatments.

The present invention will be described further through the following examples, which are illustrative and non-limiting in nature.

EXAMPLE 1

Heucophos ZMP, a corrosion inhibiting pigment containing zinc cation and molybdate and phosphate anions available from Heubach, is dispersed under high shear in propylene glycol monomethyl ether. The dispersion is added to a mixer containing Silberline SPARKLE SILVER® 5745 aluminum paste so as to provide 10% by weight of the pigment with respect to the weight of aluminum. The mixture is agitated for about 80 minutes to produce a uniform paste.

Comparative Example 1

Example 1 was repeated, except no ZMP pigment was added.

EXAMPLE 2

Example 1 was repeated, except MolyWhite212, a corrosion-inhibiting pigment containing calcium and zinc cations and molybdate anion available from Sherwin Williams, was used as the corrosion-inhibiting pigment and Silberline TUFFLAKE™ 3645 was used as the aluminum paste.

EXAMPLE 3

Example 1 was repeated, except MolyWhite92, a corrosion-inhibiting pigment containing magnesium and zinc cations and molybdate and silicate anions available from Sherwin Williams, was used as the corrosion-inhibiting pigment and TUFFLAKE™ 3645 was used as the aluminum paste.

EXAMPLE 4

Example 1 was repeated, except MolyWhiteMZAP, a corrosion-inhibiting pigment containing calcium and zinc cations and molybdate and phosphate anions available from Sherwin Williams, was used as the corrosion-inhibiting pigment and TUFFLAKE™ 3645 was used as the aluminum paste.

Comparative Example 2

Example 2 was repeated, except no MolyWhite212 pigment was added.

EXAMPLE 5

Example 1 was repeated, except MolyWhite151, a corrosion-inhibiting pigment containing zinc cation and molybdate anion available from Sherwin Williams, was used as the corrosion-inhibiting pigment and Silberline SSP554 was used as the aluminum paste.

EXAMPLE 6

Example 1 was repeated, except MolyWhiteZNP, a corrosion-inhibiting pigment containing zinc cation and molybdate and phosphate anions available from Sherwin Williams, was used as the corrosion-inhibiting pigment and SSP554 was used as the aluminum paste.

Comparative Example 3

Example 5 was repeated, except no MolyWhite151 pigment was added.

Each of the pastes obtained from the above examples was incorporated into a typical aqueous general industrial coating formulation in accordance with the following procedure. Enough paste to yield 20.5 grams of aluminum was weighed out. The paste, 41.2 grams of glycol ether EB, 5.1 grams of "TEXANOL" (from Eastman), 1.03 grams of Patcote 519 (from Patcote), 0.62 grams Dow Corning 14 (from Dow Corning), 73.5 grams deionized water and 313.7 grams Joncryl 537 resin (an acrylic emulsion from Johnson Wax) were blended together to form a uniform composition. Duplicate 200 gram aliquots of each composition were placed in a constant temperature bath at 52° C. The gas evolved was collected in an inverted water-filled burette for 168 hours. The data are summarized in Table 1.

TABLE 1

| Example | Aluminum Pigment | Corrosion-inhibiting pigment | Anion(s) | Cation (s) | Percent Inhibitor | Mis. Gas |
|---|---|---|---|---|---|---|
| 1 | SS-5745 | ZMP | Molybdate, Phosphate | Zinc | 10 | 19.75 |
| Comp. Ex. 1 | SS-5745 | NONE | NONE | NONE | 0 | 143.75 |
| 2 | TF-3645 | MolyWhite 212 | Molybdate | Calcium, Zinc | 10 | 87.20 |
| 3 | TF-3645 | MolyWhite 92 | Molybdate Silicate | Magnesium, Zinc | 10 | 28.80 |
| 4 | TF-3645 | MolyWhite MZAP | Molybdate Phosphate | Calcium, Zinc | 10 | 3.40 |
| Comp. Ex. 2 | TF-3645 | NONE | NONE | NONE | 0 | 126.15 |
| 5 | SSP-554 | MolyWhite 151 | Molybdate | Zinc | 10 | 19.35 |
| 6 | SSP-554 | MolyWhite ZNP | Molybdate, Phosphate | Zinc | 10 | 14.75 |
| Comp. Ex. 3 | SSP-554 | NONE | NONE | NONE | 0 | 180.90 |

EXAMPLE 7

Example 1 was repeated except that half of the solvent content of the paste was nitroethane.

Comparative Example 5

Example 7 was repeated, except no ZMP pigment was added.

The pastes from Example 7 and Comparative Example 5 were evaluated for gas evolution in the same manner as Examples 1–6 and Comparative Examples 1–4. The results are reported in Table 2.

EXAMPLE 8

Example 2 was repeated, except the aluminum paste also was treated with iso-octyl phosphate in accordance with U.S. Pat. No. 4,565,716.

Comparative Example 6

Example 8 was repeated except no MolyWhite212 was added.

The pastes from Example 8 and Comparative Example 6 were evaluated for gas evolution in the same manner as Example 7 and Comparative Example 5, except an automotive original equipment manufacturer coating formulation was used. The results are reported in Table 2.

TABLE 2

| EXAMPLE | ALUMINUM PIGMENT | CORROSION-INHIBITING PIGMENT | SECONDARY INHIBITOR | MLS. GAS |
|---|---|---|---|---|
| 7 | SS-5745 | ZMP | Nitroethane | 13.85 |
| Comp. Ex. 5 | SS-5745 | NONE | Nitroethane | 94.30 |
| 8 | TF-3645 | MolyWhite 212 | Iso-Octyl Acid Phosphate | 4.95 |
| Comp. Ex. 6 | TF-3645 | NONE | Iso-Octyl Acid Phosphate | 18.60 |

It can be seen that the treatment with molybdate pigment provided a marked reduction in the evolution of hydrogen gas. While co-treatment with secondary inhibition systems was able to achieve additional improvements, it can be seen that the secondary inhibition alone failed to provide the same level of protection as was observed with the molybdate pigment alone.

While a detailed description of the invention has been provided above, the invention may be embodied in other specific forms without departing from the spirit or essential characteristics thereof The embodiments disclosed in the application are to be considered in all respects as illustrative and not restrictive, the scope of the invention being defined by the appended claims. All changes that come within the meaning and range of equivalency of the claims are intended to be embraced therein.

What is claimed is:

1. A metallic particle paste for forming a coating composition, comprising:
   40–90% by weight of metal particles treated with a corrosion-inhibiting molybdate pigment; and
   a solvent,
   said corrosion-inhibiting molybdate pigment being an inorganic salt consisting of molybdate anion and at least one cation selected from the group consisting of calcium, barium, strontium, magnesium, zinc and aluminum.

2. The paste of claim 1, wherein the metal particles comprise aluminum.

3. The paste of claim 1, wherein the metal particles comprise zinc.

4. The paste of claim 1, wherein the metal particles comprise bronze.

5. The paste of claim 1, wherein the molybdate pigment is present in an amount of about 1–50% by weight of the metal particles.

6. The paste of claim 5, wherein the amount of the molybdate pigment is 5–30% by weight of the metal particles.

7. The paste of claim 1, wherein the molybdate pigment is reacted chemically with a surface of the metal particles.

8. The paste of claim 1, wherein the solvent is suitable for forming an aqueous coating composition.

9. An aqueous coating composition, comprising:
   a metallic particle paste in accordance with claim 1; and
   an aqueous carrier.

10. A method of making a metallic particle paste for forming a coating composition that comprises 40–90% by weight of metal particles treated with a corrosion-inhibiting molybdate pigment; and a solvent, said corrosion-inhibiting molybdate pigment being an inorganic salt consisting of molybdate anion and at least one cation selected from the group consisting of calcium, barium, strontium, magnesium, zinc and aluminum, the method comprising
    contacting the metal particles with the corrosion-inhibiting molybdate pigment, in a liquid medium.

11. The method of claim 10, wherein a paste of the metal particles is mixed with a liquid dispersion of the molybdate pigment to provide a final paste.

12. The method of claim 10, wherein the metal particles are provided in a paste, the paste is diluted with a solvent, the diluted paste is mixed with a dispersion of the molybdate pigment in a liquid, and liquid is removed from the mixture to provide a final paste.

13. The method of claim 10, wherein the metal particles are produced in a ball mill, and the metal particles arc contacted with molybdate pigment present in the ball mill as the metal particles are produced.

14. A metal particle suitable for use in a coating composition, having a surface reacted chemically with a corrosion-inhibiting molybdate pigment that is an inorganic salt consisting of molybdate anion and at least one cation selected from the group consisting of calcium, barium, strontium, magnesium, zinc and aluminum.

15. In a painted article, the improvement wherein the article is painted with a coating composition comprising a metal particle treated with a corrosion-inhibiting molybdate pigment that is an inorganic salt consisting of molybdate anion and at least one cation selected from the group consisting of calcium, barium, strontium, magnesium, zinc and aluminum.

16. The painted article of claim 15, wherein the article is an automobile.

* * * * *